C. H. L. ROBERTS.
Churn.
No. 64,149.
Patented April 23, 1867.
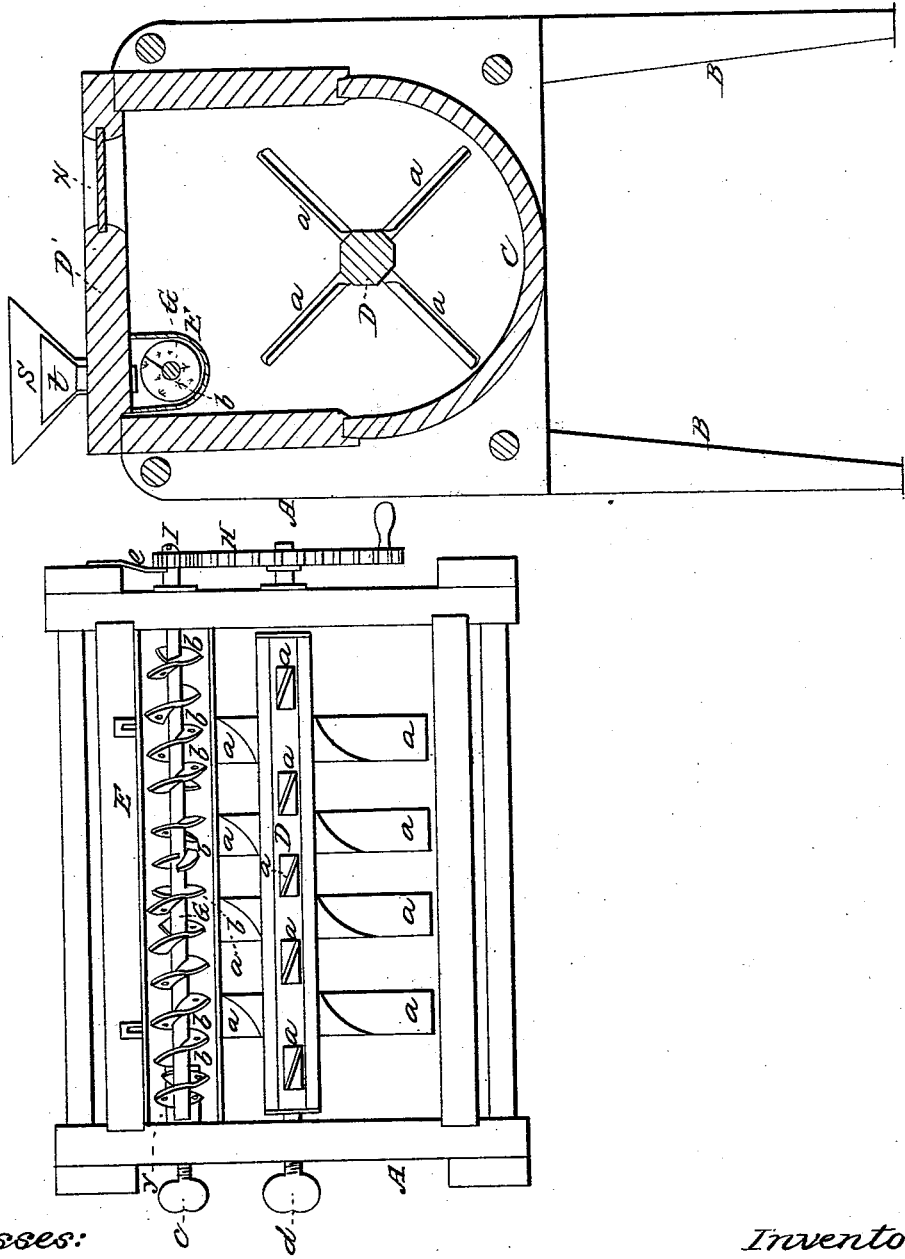
Witnesses:
P. J. Dodge.
W. Stockbridge
Inventor
C. H. L. Roberts
per
Alexander F. Mason
Att.

United States Patent Office.

CHARLES H. L. ROBERTS, OF MORRISON, ILLINOIS.

Letters Patent No. 64,149, dated April 23. 1867.

IMPROVEMENT IN CHURNS.

The Schedule referred to in these Letters Patent and making part of the same.

TO ALL WHOM IT MAY CONCERN:

Be it known that I, CHARLES H. L. ROBERTS, of Morrison, in the county of Whiteside, and in the State of Illinois, have invented certain new and useful Improvements in "Dairy Churns;" and do hereby declare that the following is a full, clear, and exact description thereof, reference being had to the accompanying drawings, and to the letters of reference marked thereon, making a part of this specification.

In the annexed drawings, A represents the churn-box, which may be of wood, in an oblong form, supported by suitable legs B B. The bottom of this box C is in a semicircular form, and has an outlet for the milk or water. D represents the horizontal dasher, which has a series of transverse arms, $a\ a$, and which is suspended at the sides of the churn-box. The lid of the box D has two openings, in which are inserted a large and small funnel, S $t$, and which are placed directly above a trough, E, placed at the top portion of the box. G represents a shaft, having its bearings in the sides of the box, and which lies within the trough. This shaft has a series of flaring perforated metallic plates, $b\ b\ b$, encircling it, by which means the cream is cleared of all foreign substances, the globules broken, the cream salted, and carried to the end of the trough where there is an opening, $y$, which allows the cream to fall into the bottom of the churn-box. H represents a large cog-wheel at the end of the box, having a suitable handle, and which meshes into a smaller cog upon the end of the shaft D. I represents a small cog at the end of the shaft G, which is held in gear by a latch, $e$, or may be placed and held out of gear by the same latch. The cream is placed in the large funnel, S, and passes in on to trough E. The small funnel $t$ is filled with salt and the cream absorbs it as it passes towards the opening $y$, thereby salting the butter in the making. After the cream passes into the churn bottom the wheel H is turned, and both shafts G and D, with their attachments, are revolved. After the butter is thus formed the latch $e$ is raised and the shaft G thrown out of gear, which allows the butter to be gathered by the dasher. X represents an opening made in the lid, with a glass covering to see whenever the butter is ready for taking.

This device will cause the butter to be formed in a very short time, and already salted, so that it is only necessary to run the milk off and clean the churn, which is done by pouring the water in the large funnel and revolving the shafts. These shafts G D, with their attachments, are held in the box by their respective set-screws $c\ d$, and can be taken from the churn whenever so desired.

Having thus fully described my invention, what I claim as new, and desire to secure by Letters Patent, is—

1. The arrangement of the shaft G, with its plates $b\ b$, and placed within the trough E, in the manner and for the purposes specified.

2. The box A, with lid D', having funnels S $t$, and covered opening $x$, dasher shaft D, in combination with the trough E, all arranged and operating in the manner substantially as and for the purposes set forth.

In testimony that I claim the foregoing I have hereunto set my hand this 18th day of February, 1867.

CHAS. H. L. ROBERTS.

Witnesses:
　HENRY R. SAMPSON,
　WM. LANE.